United States Patent [11] 3,634,105

[72] Inventors Roderick Gerald Beck
1065 York Drive;
Lyle Homer Parks, Route 2; Mounir Ahmad Shatila, 241 Jefferson, all of Blackfoot, Idaho 83221
[21] Appl. No. 39,141
[22] Filed May 20, 1970
[45] Patented Jan. 11, 1972
Continuation of application Ser. No. 655,746, July 25, 1967, now abandoned. This application May 20, 1970, Ser. No. 39,141

[54] DEHYDRATED POTATO PROCESSES AND PRODUCTS
7 Claims, No Drawings
[52] U.S. Cl. ..................................................... 99/207, 99/100 P
[51] Int. Cl. ..................................................... A23b 7/02, A23l 1/00
[50] Field of Search ........................................... 99/100 P, 103, 207, 100

[56] References Cited
UNITED STATES PATENTS
2,863,770 12/1958 Spieser .......................... 99/207
3,136,643 6/1964 Reeves et al. .................. 99/207
3,297,450 1/1967 Loska ............................ 99/207

Primary Examiner—Norman Yudkoff
Assistant Examiner—Hiram H. Bernstein
Attorney—Morton, Bernard, Brown, Roberts and Sutherland ABSTRACT: A dehydrated potato product yielding rapidly upon reconstitution pieces resembling pieces of fresh potato suitable for frying, as for instance hash brown potatoes, formed by preparing an aqueous dough of about 23 percent solids, not less than about 80 percent of which are undamaged potato cells and the balance of which includes conventional additives and not less than about 6 percent extracellular starch in a form to provide sufficient soluble edible adhesive, forming pieces of the desired size, and drying the pieces to a moisture content of about 7½ percent.

DEHYDRATED POTATO PROCESSES AND PRODUCTS

This application is a continuation of our copending application, Ser. No. 655,746 filed July 25, 1967, and we claim the priority of said application. The priority of common subject matter disclosed in our earlier application, Ser. No. 547,195 filed on May 3, 1966, pending on July 25, 1967, mentioned in Ser. No. 655,746 and abandoned on Dec. 9, 1968, is also claimed.

This invention relates to a novel dehydrated potato product and a process for producing the same, involving a specific intermediate mix form. The intermediate and the dehydrated end products are composed essentially of debris-free cooked potato flesh containing some additives, flavorings or other components, singly or in appropriate combination. The intermediate is given a higher solids-to-moisture ratio than found in the normally cooked potato flesh by addition of undamaged dehydrated potato cells and is used to form a sheet from which pieces are cut preparatory to drying for producing as end products dehydrated substitutes for pieces of dehydrated natural potato for use in making pan fried and hash brown potato dishes.

Although many dehydrated potato products such as potato granules and potato flakes have been receive well and are produced commercially on a large scale, similar widespread use has not been achieved by sliced potatoes and diced potatoes. Slices and dice require prolonged rehydration and are therefore not "instant" and do not have the required convenience factor. Attempts have been made to shorten the preparation time by drying thinner pieces and more recently by explosion puffing and irradiation to create a more porous structure which is more permeable to the rehydrating solution. Although this has resulted in improved products, there is still a need for dehydrated potato pieces which can be prepared completely in a few minutes.

It is a purpose of this invention to describe a process for producing large potato pieces which can be rehydrated and prepared as pan fried potatoes or hash brown potatoes in a fraction of the time required for conventionally dried pieces of the same size.

It is a further object of this invention to produce such potato pieces free of dark spots, eye, or blemishes which are common defects in potato pieces described in prior art.

It is a further object to produce potato pieces suitable for pan fries or hash browns with flavor and color stability superior to that of conventionally dried potato slices made from intact potatoes.

If is a further object of this invention to produce dehydrated potato pieces which can be used interchangeably with conventional pieces of the same dimensions but with added convenience and superior performance.

When using raw potatoes as starting material, our process comprises the normal preparation step of producing a cooked potato or potato piece. From this we produce a debris-free slurry or about 17 percent solids as described in copending application, Ser. No. 222,538, assigned to American Potato Company as is this present application. Although we prefer to produce debris-free cooked potato flesh in this manner, it is obvious that the same result can be obtained following complete removal of skin, eyes, and defective portions by costly mechanical and/or manual trimming. The solids content of the slurry is then increased to about 22–25 percent by partial dewatering, addition of dehydrated instant potato, or both. Additives such as antioxidants sulfite salts, calcium salts, sugar, starch or other binders are added as required to control stability, color, and texture. This thickened slurry or mix is now comparable in consistency to a very dry mashed potato. By eliminating precooking and cooling of the potato prior to cooking and by adjusting the slurrying procedure at least a portion of the required adhesive character is obtained from the controlled rupture of a small fraction of the potato cells.

In another application of our invention, the debris-free potato mix is made by reconstituting debris-free dehydrated potato products such as potato granules or potato flakes, which in commercial form already contain the desired additives. Any combination of potato solids whether from a freshly cooked source or from a dehydrated source can be used in our process by preparing a mix of the proper moisture and containing the proper additives.

We have found several means of obtaining the controlled amount of adhesion which is necessary in the mix. In our early test work, as disclosed in our original application, Ser. No. 547,195, filed May 3, 1966, a satisfactory product resulted from our process if product piece size and rehydration time and temperature were controlled closely. We have now developed improved processes which are not sensitive to changes in preparation techniques and which resist sloughing even when overrehydrated or when rehydrated in very hot water.

In these improved processes, the adhesive force necessary to result in permanently agglomerated, previously separated potato cells is obtained by a heat treatment step which gelatinizes raw starches uniformly dispersed in the dough thus forming a binding gel structure which is maintained in the dough throughout the process.

One example of an improved process for producing hash brown pieces and using potato granules as the sole source of potato solids, is as follows:

330 grams of commercial potato granules are mixed uniformly with 30 grams of raw corn starch. This mix is then added uniformly to 1,170 ml. of water heated to 185° F. in a Hobart mixer operated at low speed for 2–3 minutes to form a homogeneous dough of about 22% solids. The dough is then extruded in strips about one-eighth inch by one-fourth inch in cross section and of any length onto a screen. The extruded dough is then steamed for about 10 minutes on the screen. The heat-treated strips are then dried, still on the screen, at about 180°–200° F. for about 3–4 hours to reduce the moisture content to about 7½ percent.

An alternate improved process has been also developed in which the heat treatment step to gelatinize the raw starch is accomplished before the dough is extruded. In this application, the heat-treated dough mix must be kept hot until extrusion is completed.

When the end product desired is an instant ⅛-inch potato slice suitable for pan frying, pieces of the desired slice size are formed from the hot sheeted mix. These pieces are then predried out of contact with one another to a moisture content of about 65 percent by subjecting the individual pieces to air at about 300° F. for about 5–6 minutes. Any other set of conditions which gives this moisture reduction without damage would be acceptable. The purpose of this step is to predry the surfaces of the pieces so they do not adhere to each other in final drying. The final drying step immediately follows before diffusion of moisture to the surface of the pieces can create any stickiness. The final drying step is normally conducted with the pieces in several layers on a continuous perforated belt dryer using air at about 200° F. until the moisture content is reduced to about 6 to 7 percent.

In the development of our novel improved processes, several facts were disclosed by our research:

We found that all raw starches tested were effective adhesive agents, but that raw corn starch resulted in finished products with superior rehydration and handling attributes.

We further found that effective starch gel formation in the dough requires a minimum heat treatment temperature of about 190° F. In tests where dough was heated to only 170° F., no beneficial result was found. Another important discovery of our research was that the temperature at which the dough is dried is critical. If excessive drying temperatures are employed, the outer layer of the extruded pieces dries too quickly causing case hardening which results in puffed pieces which slough undesirably when reconstituted.

The starch added for adhesion must be in the raw or ungelatinized state when mixed into the dough. A cooked or gelatinized starch ingredient does not form the proper gel distribution. The most desired quantity of raw starch ranges from 6–2 percent. With less than 6 percent the reconstituted product sloughs excessively. With more than 20 percent the end product has less potato flavor, less desirable browning, and has an undesirable tough or rubbery texture. Our tests with corn starch and commercial potato granules have shown that about 9 percent starch and 91 percent granules is optimum.

Mixing of the heat-treated dough can be damaging to the starch gel structure. We have found that if mixing is required, the dough must be kept hot during this operation. If the dough cools before the finish of mixing or before extrusion, the gel structure is disrupted and the advantages of our process are decreased.

Although the drying step can be started immediately following the heat treatment of extruded pieces, even more resistance to sloughing can be obtained by allowing the pieces to cool thereby creating a more stable gel structure before dehydration. As mentioned, satisfactory products can be made from freshly cooked potatoes or from granules or flakes. It is obvious to anyone skilled in the art that mixtures of any of these potato solids sources can also be utilized.

Although we prefer a solid content of the dough of about 23-25 percent, a range from 17-50 percent gives useful results. If the solids content is appreciably below 20 percent, physical handling becomes difficult. If the solids of the dough is appreciably above 25 percent, the end products are more susceptible to sloughing upon reconstitution.

The products of our novel processes have great flexibility in use. The following conditions of rehydration all give properly reconstituted hash brown pieces which can be pan fried in about 4 minutes at about 275° F.

Cold water soaking for about 15-30 minutes.
140° F. water soaking for about 5-10 minutes.
200° F. water soaking for about 3-5 minutes.

The products of our invention can be subjected to prolonged rehydration without undesirable sloughing; however, any liquid absorbed in excess of 1.5-2.0 times the dry weight would have to be boiled away before frying takes place.

The excellent rehydration characteristics allow simultaneous rehydration and frying in a single pan. An excellent one-pan recipe for hash browns is as follows:

125 grams of the dehydrated hash browns are mixed with salt, fat, and 1 to 1¼ cups of water. When the mix is heated, an excellent hash brown potato with desirable piece identity can be finished in about 10-14 minutes.

There are several advantages in the products of our invention over presently available products. The dehydration of a conventional blanched potato piece requires many hours and we have found by using sensitive gas chromatographic techniques that rancidity actually develops before the piece reaches the required finished moisture content. Although this rancidity is not strongly objected to by a majority of users, it may be at least partially responsible for limited usage of these products. In our processes, if freshly cooked potatoes are used, they are immediately mixed with the conventional protective additives which are incorporated uniformly and contact and protect all parts of the mix.

Storage of the final dried products demonstrates the stability of the products of our invention as evidenced by low hexanal formation.

A further advantage is gained from the fact that the products of our invention are made from a debris-free cooked potato slurry or from debris-free dehydrated products. The end products are therefore free of blemishes, eyes, fibers, and other discolored pieces which would have to be mechanically or manually sorted from conventional dehydrated potato pieces.

The permeability which is attained by the permanent agglomeration of previously separated potato cells allows ready penetration of reconstitution liquid in contrast to conventional dehydrated pieces which have a tough horny exterior which requires prolonged soaking for proper rehydration. When the products of our invention are to be reconstituted for pan fries or hash browns, it is not necessary to bring about complete rehydration, since much of this water would simply be reevaporated as frying takes place.

A further advantage of the products of our invention is the ability to incorporate sugars in desired concentration to the mix so that the color can be controlled in the fried end product. It is well known that fresh potatoes contain varying amounts of sugar depending upon growing and storage conditions. It is the subject of many patents to control the sugar content of fresh potato pieces by complicated processing steps.

We claim:

1. A process for producing a reconstituted dehydrated cooked potato strip or piece suitable for use, without loss of piece identity, in the preparation of dishes as a substitute for a like strip or piece of natural cooked potato comprising the steps of:

a. producing an aqueous dough with a solids content on the order of 25 percent, said solids comprising not less than 80 percent undamaged separated previously dehydrated cooked potato cells and a maximum of 20 percent ungelatinized raw starch added in an amount sufficient after subsequent gelatinization to give the required adhesive character to the dough to impart to the eventual dehydrated strip or piece a texture to allow reconstitution and pan frying without loss of piece identity;
   b. subjecting said dough to a temperature sufficient to gelatinize the ungelatinized starch without drying;
   c. forming said heat-treated dough while still hot into pieces or strips about one-eighth to one-fourth inch in thickness, suitable for eventual dish preparation;
   d. predrying said pieces or strips out of contact with one another to remove the surface moisture to prevent them from adhering to one another;
   e. finally drying said pieces or strips immediately following the predrying to prevent diffusion of moisture to their surface to a moisture content on the order of 7½ percent; and
   f. reconstituting said pieces with water without loss of piece identity for use in dish preparation.

2. A process for providing a reconstituted dehydrated cooked potato strip or piece suitable for use, without loss of identity, in the preparation of dishes as a substitute for a like strip or piece of natural cooked potato comprising the steps of:

a. producing an aqueous dough of 17 to 50 percent solids, by mixing not less than 80 percent undamaged separated previously dehydrated cooked potato solids with ungelatinized starch to give total extra cellular raw starch content of 6 to 20 percent of the total solids content;
   b. subjecting said dough to a temperature sufficient to gelatinize the raw starch without drying;
   c. forming said heat-treated dough while still hot into pieces or strips about one-eighth by one-fourth inch in thickness, suitable for eventual dish preparation;
   d. predrying said pieces or strips out of contact with one another to remove the surface moisture to prevent them from adhering to one another;
   e. finally drying said pieces or strips, immediately following the predrying to prevent diffusion of moisture to their surface to a moisture content on the order of 7½ percent; and
   f. reconstituting said pieces with water without loss of piece identity for use in dish preparation.

3. A process for producing a reconstituted dehydrated cooked potato strip or piece suitable for use, without loss of piece identity, in the preparation of dishes as a substitute for a like strip or piece of natural cooked potato comprising the steps of:

a. producing an aqueous dough containing on the order of 25 percent solids consisting of undamaged separated previously dehydrated potato granules and a quantity of added raw starch, said starch being in the range of from about 6 to about 9 percent of the solids;

b. subjecting said dough to a temperature sufficient to gelatinize the ungelatinized starch without drying;

c. forming said heat-treated dough while still hot into pieces or strips suitable for dish preparation, about one-eighth to one-fourth inch in cross section;

d. predrying said pieces or strips out of contact with one another to remove the surface moisture to prevent them from adhering to one another;

e. finally drying said pieces or strips, immediately following the predrying to prevent diffusion of moisture to their surface to a moisture content on the order of 7½ percent; and f. reconstituting said pieces with water without loss of piece identity for use in dish preparation.

4. A process for producing a reconstituted and fried, previously dehydrated, potato strip comprising the steps of:

a. admixing undamaged separated previously dehydrated potato granules with raw starch, said starch being in the range of about 6 to 9 percent;

b. producing a dough of about 25 percent solids with said mixture;

c. subjecting said dough to a temperature sufficient to gelatinize the ungelatinized starch without drying;

d. forming said heat-treated pieces while still hot into pieces about one-eighth to one-fourth inch in thickness suitable for rehydration and frying;

5. A process for producing a reconstituted dehydrated cooked potato strip or piece suitable for use without loss of piece identity in the preparation of dishes as a substitute for a like strip or piece of natural cooked potato comprising the steps of:

a. producing an aqueous dough with a solids content on the order of 25 percent, said solids comprising not less than 80 percent undamaged separated previously dehydrated cooked potato cells and a maximum of 20 percent ungelatinized raw starch added in an amount sufficient after subsequent gelatinization to give the required adhesive character to the dough to impart to the eventual dehydrated strip or piece a texture to allow reconstitution and pan frying without loss of piece identity;

b. forming said dough into pieces or strips about one-eighth to one-fourth inch thick, suitable for eventual dish preparation;

c. subjecting said pieces or strips to a temperature sufficient to gelatinize the ungelatinized starch without drying;

d. predrying said pieces or strips out of contact with one another to remove the surface moisture to prevent them from adhering to one another;

e. finally drying said pieces or strips immediately following the predrying to prevent diffusion of moisture to their surface to a moisture content on the order of 7½ percent; and f. reconstituting said pieces with water without loss of piece identity for use in dish preparation.

6. A process for producing a reconstituted dehydrated cooked potato strip or piece suitable for use, without loss of piece identity, in the preparation of dishes as a substitute for a like strip or piece of natural cooked potato comprising the steps of:

a. producing an aqueous dough of 17 to 50 percent solids, by mixing not less than 80 percent undamaged separated previously dehydrated cooked potato solids with ungelatinized starch to give total extra cellular raw starch content of 6 to 20 percent of the total solids content;

b. forming said dough into pieces or strips about one-eighth to one-fourth inch thick, suitable for eventual dish preparation;

c. subjecting said pieces or strips to a temperature sufficient to gelatinize the ungelatinized starch without drying;

d. predrying said pieces or strips out of contact with one another to remove the surface moisture to prevent them from adhering to one another;

e. finally drying said pieces or strips, immediately following the predrying to prevent diffusion of moisture to their surface to a moisture content on the order of 7½ percent; and f. reconstituting said pieces with water without loss of piece identity for use in dish preparation.

7. A process for producing a reconstituted dehydrated cooked potato strip or piece suitable for use, without loss of piece identity, in the preparation of dishes as a substitute for a like strip or piece of natural cooked potato comprising the steps of:

a. producing an aqueous dough containing on the order of 25 percent solids consisting of undamaged separated previously dehydrated potato granules and a quantity of added raw starch, said starch being in the range of from about 6 to about 9 percent of the solids;

b. forming said dough into pieces or strips about one-eighth to one-fourth inch thick, suitable for eventual dish preparation;

c. subjecting said pieces or strips to a temperature sufficient to gelatinize the ungelatinized starch without drying;

d. predrying said pieces or strips out of contact with one another to remove the surface moisture to prevent them from adhering to one another;

e. finally drying said pieces or strips, immediately following the predrying to prevent diffusion of moisture to their surface to a moisture content on the order of 7½ percent; and f. reconstituting said pieces with water without loss of piece identity for use in dish preparation.

* * * * *

UNITED STATES PATENT OFFICE
CERTIFICATE OF CORRECTION

Patent No. 3,634,105          Dated Jan. 11, 1972

Inventor(s) R.G.Beck, L.H.Parks, M.A.Shatila

It is certified that error appears in the above-identified patent and that said Letters Patent are hereby corrected as shown below:

In the Specification:

Column 1, Line 24, "receive" should read --received--
Column 1, Line 42, "eye" should read --eyes--
Column 1, Line 48, "If" should read --It--
Column 2, Line 75, "6-2" should read --6-20--

In the Claims:

Claim 2, Line 3, "identity" should read --piece identity--
Claim 4, steps e through h omitted, should read:

--e. predrying said pieces out of contact with one another to remove the surface moisture to prevent them from adhering one to another;

f. finally drying said pieces by following the predrying to prevent diffusion of the moisture to their surface, to a moisture content on the order of 7 1/2 percent;

g. reconstituting said pieces with water without loss of piece identity; and h. frying said rehydrated pieces to produce permanently agglomerated previously separated and dehydrated intact hash brown potato.--

Signed and sealed this 22nd day of August 1972.

(SEAL)
Attest:

EDWARD M.FLETCHER,JR.          ROBERT GOTTSCHALK
Attesting Officer          Commissioner of Patents